No. 737,579. Patented September 1, 1903.

UNITED STATES PATENT OFFICE.

ERNST BURSCHELL, OF LANDAU, GERMANY.

PROCESS OF PURIFYING GAS.

SPECIFICATION forming part of Letters Patent No. 737,579, dated September 1, 1903.

Application filed December 6, 1902. Serial No. 134,185. (No specimens.)

*To all whom it may concern:*

Be it known that I, ERNST BURSCHELL, doctor of philosophy, manager, residing at Industrystrasse 18, Landau, in the Palatinate, German Empire, have invented new and useful Improvements in Processes of Separating Hydrogen Sulfid from Gases, of which the following is a specification.

The present invention relates to a method for separating hydrogen sulfid from water-gas, Dowson gas—that is, generated gas—and from such gases which are developed by the dry distillation or gasification of such substances that contain sulfur—as, for instance, pit-coal, brown coal, or the like. This has hitherto been carried out almost exclusively by dry processes by allowing the gas to pass through hydrated iron ores, which combine with the hydrogen sulfid to form sulfid of iron. After exhaustion, these ores are regenerated by being exposed to the air, whereby sulfur is set free and ferric hydroxid is formed. By an admixture of oxygen or of atmospheric air to the raw gas in the proportion required for the decomposition of the hydrogen sulfid according to the formula

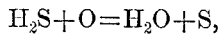

the regeneration of the effective ferric hydroxid can take place inside the purifying apparatus. This so-called "dry purifying process" has many drawbacks. It requires a large area for the apparatus and the regeneration and necessitates a considerable amount of transportation. The purifying medium contained in box-like apparatus very often gives rise to troublesome increases of pressure, and the hydraulic valves of the purifying apparatus are always a dangerous part of the same. For this reason attempts have already been made to eliminate the hydrogen sulfid from the gas by washing with liquids. For this purpose the gas-water obtained at the gasworks was used. Hills tried to convert the carbonate of ammonia contained in the gas-water into caustic ammonia ($NH_4OH$) by heating the gas-water, and Claus produced gaseous ammonia from such water, which ammonia when mixed with the gas combines with the hydrogen sulfid, from which it may be separated in the form of sulfid of ammonium by washing with water. These processes did, however, not attain any great importance.

The process to which this application relates has for its object to oxidize the hydrogen sulfid by washing the same with a solution of metallic salts, whereby sulfur is separated in the same manner as this is already done in the dry purification process by the introduction of air or oxygen.

The following reaction is known:

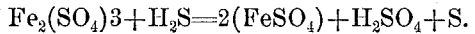

This reaction is, however, not adapted to separate hydrogen sulfid from gases, as the sulfid of hydrogen is exceedingly slowly oxidized by this process—*i. e.*, by washing the same with solutions of ferric salts, besides the acid set free by the process tends to prevent or retard the reaction itself.

I have discovered that the oxidation of hydrogen sulfid by means of ferric salts according to the above-stated formula is accomplished rapidly and reliably if with the sulfates of iron the salts of such metals are mixed which possess a greater affinity for hydrogen sulfid and the sulfids of which are decomposed by the ferric salts. Experiments have shown that this will be done in the best way by copper salts. The reaction which takes place in this process may be represented by the following equation:

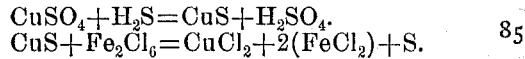

By the reduction of the cupric salts by the ferrous salts more hydrogen sulfid can be oxidized.

The reaction between cupric sulfid and ferrous or ferric salts is well known; but their application to the purification of gas is new.

The process is best carried out either by allowing the gas to pass through an apparatus in which a solution of metallic salts is dripping down or by sending the gas through rotating washing apparatus which contains the solution of metallic salts. The solution of protoxy salts resulting therefrom can after their complete or partial reoxidation be used over again. The sulfur set free can be utilized as a by-product.

The oxidation may be carried out intermittently or continuously.

The addition of other salts which will promote the oxidation of the hydrogen sulfid or the reoxidation of the protoxy salts or merely effect a diluting of the solution comes within the scope of the invention.

Now what I claim, and desire to secure by Letters Patent, is the following:

1. A process for separating hydrogen sulfid from gases, which consists in treating the gas with a solution containing an iron salt and the salt of a metal having a greater affinity for hydrogen sulfid than said iron salt and the sulfid of which is decomposed by the iron salt.

2. A process for separating hydrogen sulfid from gases, which consists in treating the gas with an oxidizing solution containing both copper and iron salts.

In testimony whereof I have signed my name to this specification in the presence of two subscribing witnesses.

ERNST BURSCHELL.

Witnesses:
LEONHARD WINKLER,
LUDWIG TOCKEL.